US005830988A

United States Patent [19]

Chan

[11] Patent Number: 5,830,988
[45] Date of Patent: Nov. 3, 1998

[54] INDANE POLYETHERIMIDES

[75] Inventor: Kwok Pong Chan, Troy, N.Y.

[73] Assignee: Molecular OptoElectronics Corporation, Watervliet, N.Y.

[21] Appl. No.: 918,453

[22] Filed: Aug. 26, 1997

[51] Int. Cl.$^6$ .............................. C08G 73/10; C08G 8/02
[52] U.S. Cl. ..................... 528/353; 528/125; 528/128; 528/171; 528/172; 528/173; 528/174; 528/179; 528/183; 528/185; 528/188; 528/190; 528/201; 528/220; 528/229; 528/350
[58] Field of Search ..................... 528/125, 128, 528/171, 172, 173, 174, 179, 188, 183, 185, 190, 201, 220, 229, 350, 353

[56] References Cited

U.S. PATENT DOCUMENTS

| Re. 34,431 | 11/1993 | Brunelle et al. | 528/352 |
|---|---|---|---|
| 2,979,534 | 4/1961 | Petropoulos et al. | 260/619 |
| 3,856,752 | 12/1974 | Bateman et al. | 260/65 |
| 3,915,939 | 10/1975 | Wilson | 260/78 |
| 4,334,106 | 6/1982 | Dai | 568/719 |
| 4,734,482 | 3/1988 | Tamai et al. | 528/185 |
| 4,988,785 | 1/1991 | Paul et al. | 526/259 |
| 5,145,926 | 9/1992 | Patel et al. | 526/284 |

OTHER PUBLICATIONS

K. C. Stueben, "Polymers Containing the 3,3,3',3'–Tetramethyl–1,1'–Spirobiindance Residue", Journal of Polymer Science: Part A, 3, 3209–3217 (1965) The month in the date of publication is not available.

Hilmar Franke, "Polyimide Lightguides", Polymers for Lightwave and Integrated Optics: Technology and Applications Ch. 8, 207–230 (Lawrence A. Hornak ed. 1992) The month in the date of publication is not available.

John C. Wilson, "Polyamides and Polyesters Derived from 1,1,3–Trimethyl–3–(p–aminophenyl)–5–inadanamine and 1,1–3–Trimethyl–3–(p–hydroxphenyl)–5–indanol", Journal of Polymer Science: Polymer Chemistry Edit. 13, 749–754 (1975) The month in the date of publication is not available.

John C. Petropoulos and James J. Fisher, "The Dimers of Ring Substituted Alpha–Methylstyrenes", J. Amer. Chem. Soc. 80, 1938–41 (1958) The month in the date of publication is not available.

H. S. Chao and E. Barren, "Synthesis and Evaluation of Polyimides Derived from Spirobisindane Dietheranhydride", Polymer Prepr. Am. Chem. Soc. Div. Polym. Chem. 33(1),1024–25 (1992) The month in the date of publication is not available.

*Primary Examiner*—P. Hampton-Hightower
*Attorney, Agent, or Firm*—Heslin & Rothenberg, P.C.; Martha L. Boden, Esq.

[57] ABSTRACT

Polyetherimide polymers prepared from monomers containing indane moieties are disclosed. The high molecular weight indane polyetherimides are transparent, ductile, and exhibit high glass transition temperatures (>200° C.). In addition, the polyetherimides are thermally stable at high temperatures and exhibit good optical properties making them useful in high temperature processing applications, in the fabrication of optoelectronics devices, and in optical applications.

13 Claims, No Drawings

INDANE POLYETHERIMIDES

The following invention was made with Government support under contract number F33615-95-C-5432 awarded by the United States Air Force. The Government has certain rights in this invention.

FIELD OF THE INVENTION

The present invention relates to linear polyetherimide polymers derived from indane bisphenols, and more particularly to high molecular weight indane polyetherimides exhibiting high glass transition temperatures and good thermal stability.

BACKGROUND OF THE INVENTION

Organic polymers are known to be compatible with semiconductor electronics technology, are economical and practical, and have a large capacity for engineered properties. Organic polymers that also exhibit good optical properties are therefore attractive for use in optoelectronic devices and for interconnections in optical communication systems. Organic polymer optical waveguides have been investigated for use as flexible interconnections and in optoelectronic integrated circuits (OEICs).

For example, organic polymers such as polymethylmethacrylate (PMMA), polystyrene (PS), and polycarbonate (PC) have excellent optical transparency in the visible wavelength, and thus, they are often employed as materials for a variety of optical components, such as optical waveguides. However, these polymers are not thermally stable at high temperatures (>200° C.). High thermal stability should be the first priority in optical waveguides used in OEICs in order to provide compatibility with high-performance IC fabrication processes. In addition, precise control of the refractive index is essential for fabricating single-mode optical waveguides with core/cladding systems and for optical interconnections between different materials. Low optical loss in the near infrared wavelengths of 1.3 and 1.55 micron is required for optical telecommunication systems.

Polyetherimide polymers (PEI) have excellent thermal stability and have been investigated as waveguide materials. Polyetherimide is a unique class of organic polymer with great potential utility in optical and optoelectronic applications. The material is an amorphous thermoplastic characterized by its excellent mechanical strength per unit weight, high heat resistance and thermal stability, high glass transition temperatures, low and stable dielectric constants, high dielectric strength, good hydrolytic resistance and broad chemical resistance. Thus, they are often referred to as high performance polymers as compared with polycarbonate, polyethylene, polystyrene, polymethylmethacrylate, polybutadiene, etc.

In addition, polyetherimides are compatible with conventional microelectronic fabrication techniques and have excellent molding and machining properties. The aromatic imide units provide stiffness, while the ether linkages allow for good melt-flow characteristics and processability. Polyetherimides are also transparent in the visible and near infrared, with a refractive index of about 1.7.

The most familiar high performance polyetherimide polymers are derived solely from the monomer 2,2-bis(4-hydroxyphenyl)propane, commonly known as and referred to herein as "bisphenol A" or "BPA". BPA polyetherimide, which is also referred to herein as "BPA-PEI", is commercially available from General Electric Company as ULTEM®. BPA-PEI has a glass transition temperature of approximately 215° C. and is represented by the following general structure

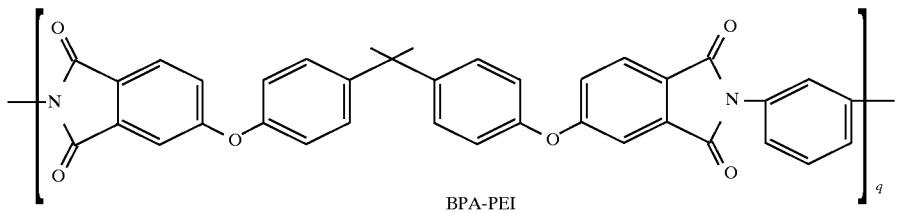

BPA-PEI

Properties of polyetherimide polymers can be modified by varying the bisphenol monomer as is the case with PEI derived from the monomer 6,6'-dihydroxy-3,3,3',3'-tetramethyl spirobiindane, which is also referred to herein as "SBI". The structure of SBI is represented as

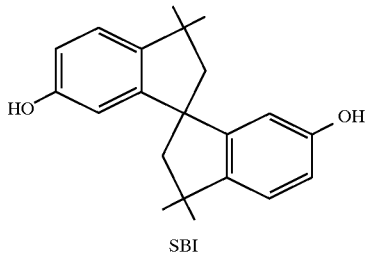

SBI

However, as reported by H. S. Chao and E. Barren in Polymer Prepr. Am. Chem. Soc. Div. Polym. Chem. 33(1), 1024–25 (1992), the mechanical strength and ductility of SBI-PEI, wherein a moiety of SBI is substituted in the polyetherimide for that of BPA, are much reduced relative to BPA-PEI, and SBI-PEI was found to be brittle. In addition, SBI-PEI is difficult to prepare due to the high tendency of the monomers to form cyclic polymers. To avoid the problems associated with SBI-PEI, SBI and BPA monomers are often used in combination to produce a copolymer with a high glass transition temperature, Tg (>215° C.) and the required toughness.

The present invention is based on the unexpected discovery that compounds containing indane moieties can be polymerized to form a wide variety of unique polyetherimide polymers. The novel linear polyetherimide homopolymers of the present invention are derived from various indane bisphenols and are similar in structure to SBI-PEI. However, the present polyetherimide homopolymers demonstrate improved thermal behavior relative to BPA-PEI and improved ductility relative to SBI-PEI. The improvements in thermal properties and ductility are also observed in linear polyetherimide copolymers containing polyetherimide units derived from indane bisphenols in combination with polyetherimide units derived from various diol compounds. In addition, the clear indane polyetherimide homopolymers and copolymers bearing this combination show improved optical properties.

The improvements in ductility and in optical and thermal properties exhibited by the present indane polyetherimide polymers allow them to be useful in high temperature processing applications and in various optical and optoelectronics applications such as in waveguide optical interconnect schemes, as optical fibers, in optoelectronic packaging, in optoelectronic integrated circuits, as precision optical components, and in second order nonlinear optical (NLO) waveguide applications.

SUMMARY OF THE INVENTION

Accordingly, the linear indane polyetherimide polymers comprise structural units of formulas (I), (II), and (III)

$$+(Z^1)_a-A^1-Z^2+_{1-(m+n)} \quad (I)$$

$$+(Z^1)_a-A^2-Z^2+_m \quad (II)$$

and $$+(Z^1)_a-A^3-Z^2+_n \quad (III)$$

wherein m is the mole fraction of structure (II), n is the mole fraction of structure (III), and the quantity 1−(m+n) is the mole fraction of structure (I); wherein m and n each independently have a value from 0 to about 0.99, and the sum of m and n is from 0 to about 0.99.

Each $R^1$ and $R^2$ in the structural formulas below is independently hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, nitro, halogen, cyano, hydroxy, or deuterated equivalents thereof. Preferably, each $R^1$ is hydrogen or deuterium, and each $R^2$ is methyl, trifluoromethyl, or a deuterated equivalent thereof.

$A^1$ is an indane moiety represented by structural formula

Moieties having structural formula $A^1$, referred to herein as an "indane moieties", are generally derived from 5-hydroxy-3-(4-hydroxyphenyl)-1,1,3-tri($R^2$)indane compounds, which are also referred to herein as "indanols" or "indane bisphenols", and which may be substituted or unsubstituted.

$Z^1$ and $Z^2$ are phthalimide structural moieties represented by structural formulas wherein $R^3$ is selected from the group of structural moieties having formulas (IV), (V), (VI), (VII), (VIII), (IX), (X), (XI), or (XII)

The value of y is 0, for example, when (IX) is derived from a 4,4'-(diamino)biphenyl compound. Alternatively, y is 1, for example, when (IX) is a derivative of a bisphenol diamine.

$A^2$ and $A^3$ are each independently a single bond, —O—, —S—, —SO$_2$—, —CO—, —C(CH$_3$)$_2$—, —C(CD$_3$)$_2$—, or —C(CF$_3$)$_2$—, or a structural moiety selected from the group having formulas (XIII), (XIV), (XV), (XVI), or (XVII)

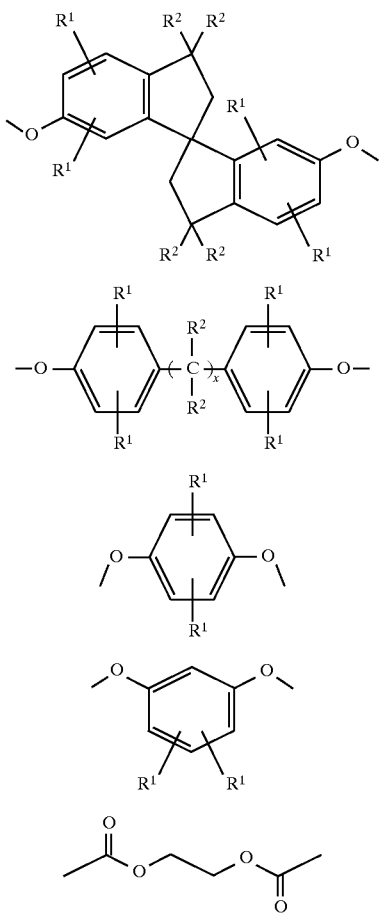

The value of x is 0 when (IX) is a substituted or unsubstituted moiety derived from a biphenol. Alternatively, x is 1, when (IX) is derived from a substituted or unsubstituted bisphenol compound such as bisphenol A, wherein each $R^2$ is methyl, or such as hexafluorobisphenol A, wherein each $R^2$ is trifluoromethyl.

The indane polyetherimide polymers of the present invention include polyetherimide homopolymers containing only structural units (I), wherein m and n are each 0. In addition, the invention includes random copolymers comprising structural units (I) and (II), and optionally (III), which are randomly dispersed in the polymeric chain. In the copolymers containing structural units (I) and (II), n is 0, and m has a value other than 0, such as 0.50. In the copolymers additionally containing structural units (III), n also has a value other than 0. For example, the values of m, n, and 1−(m+n) may each be 0.33.

The present indane polyetherimide polymers are characterized by their excellent thermal properties, such as high glass transition temperatures (>200° C.). In addition, the polymers are of high molecular weight, typically between about 10 kg/mole and 500 kg/mole.

DESCRIPTION OF THE PREFERRED EMBODIMENTS

The present invention relates to novel polyetherimide polymers containing indane moieties of formula $A^1$ above. More particularly, the indane polyetherimide polymers include linear homopolymers having structural units (I), and random linear copolymers in which structural units (I) and (II), and optionally (III), are randomly dispersed throughout the polymeric chain.

Each $R^1$ and $R^2$ substituent of structural moieties $A^1$, $Z^1$, and $Z^2$, and of formulas (IV)–(XVII) is independently hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, nitro, halogen, cyano, hydroxy, or deuterated equivalents thereof. Illustrative useful $R^1$ and $R^2$ substituents are hydrogen, alkyl such as methyl, ethyl, butyl, pentyl, octyl, nonyl, tert-butyl, neopentyl, isopropyl, sec-butyl, dodecyl, and the like; aryl such as phenyl; cycloalkyl such as cyclohexyl, cyclooctyl, cycloheptyl, cyclopentyl, and the like; alkoxyalkyl and aryloxyalkyl such as phenoxymethylene, phenoxyethylene, methoxymethylene, ethoxymethylene, methoxyethylene, butoxymethylene, propoxyethylene, and the like; arylalkyl such as phenylethyl, phenylpropyl, benzyl, and the like; and substituted alkyl and aryl groups such as cyanomethyl, 3-chloropropyl, 3,4-dichlorophenyl, 4-chloro-3-cyanophenyl, chloromethyl, dichloromethyl, trichloromethyl, fluoromethyl, difluoromethyl, trifluoromethyl, 4-nitrophenyl, phenoxyphenyl, 4-methylphenyl, 2,4-dimethylphenyl, 2-nitroethyl, nitromethyl, and the like. In addition, deuterated substituents $R^1$ and $R^2$ in which at least one hydrogen is replaced with the deuterium isotope may be employed. Each $R^1$ is preferably hydrogen or deuterium, and each $R^2$ is preferably an alkyl radical such as methyl, a halogenated alkyl radical such as trifluoromethyl, or a deuterated equivalent thereof.

Indane bisphenol compounds, from which structural moieties of $A^1$ are derived, can be prepared according to the method disclosed in U.S. Pat. No. 4,334,106 by treating iso-propenyl phenol (IPP) or a mixture of its linear oligomers with a stoichiometric excess of organic acid. IPP can be prepared by base catalyzed cracking of BPA. The disclosure of U.S. Pat. No. 4,334,106 is incorporated herein by reference. Alternatively, indane bisphenols can be prepared by reacting the corresponding indanamine with sodium nitrite in the presence of aqueous acid as described by J. C. Wilson, *J. Poly. Sci.: Polymer Chemistry Edition* 13, 749 (1975), which is incorporated herein by reference. Also, see U.S. Pat. No. 2,979,534, which is also incorporated herein by reference. The indanamine can be prepared by the method described by J. C. Petropoulos and J. J. Fisher, *J. Amer. Chem. Soc.* 80, 1938 (1958) from the corresponding carboxy indane compound, which is also incorporated herein by reference.

Most often the indane moiety of formula $A^1$ is derived from 5-hydroxy-3-(4-hydroxyphenyl)-1,1,3-trimethyl indane, which is also referred to herein as "IBP", wherein each $R^1$ is hydrogen, and each $R^2$ is methyl. However, other substituted indane bisphenols, wherein $R^1$ and $R^2$ are defined above, may be used to prepare the indane polyetherimide polymers of the present invention, and the invention is not limited to polymers derived from IBP. IBP is represented by the following structure:

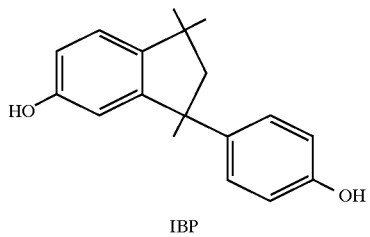

IBP $Z^1$ and $Z^2$ are phthalimide moieties, typically derived from N-alkyl-4-nitrophthalimide, wherein the alkyl group may have 1 to 10 carbons. The moieties (IV)–(XII) of $R^3$ are derived from corresponding diamine compounds.

Structural units (II) or (III) include as $A^2$ or $A^3$, respectively, a moiety derived from a diol compound. For example, $A^2$ or $A^3$ may be a moiety having formula (XIII), which is derived from a spirobiindane bisphenol. Methods for preparing spirobiindane bisphenols for use in the practice of this invention are disclosed in various references. For example, substituted spirobiindane bisphenols can be conveniently prepared by reacting the appropriately substituted BPA with concentrated hydrochloric acid, as described by Curtis in *J. Chem. Soc.*, 415–418 (1962), the disclosure of which is incorporated herein by reference. In addition, Baker and Besley, *J. Chem. Soc.* 1421 (1939), U.S. Pat. No. 2,979,534, and Stueben, *J. Poly. Sci.*, Part A, 3, 3209–17 (1965), which are incorporated herein by reference, disclose the conversion of bisphenols, such as BPA, to the corresponding spirobiindane bisphenols using sulfuric acid, benzenesulfonic acid, or p-toluenesulfonic acid. The preparation of spirobiindane bisphenols using the aforementioned condensation reaction of BPA in the presence of sulfuric acid is also described in U.S. Pat. No. 3,271,463, which is also incorporated herein by reference. U.S. Pat. No. 4,552,949, which is incorporated herein by reference, discloses the reaction in the presence of anhydrous methanesulfonic acid or hydrochloric acid, and U.S. Pat. No. 4,605,789, which is also incorporated herein by reference, teaches the reaction in the presence of strong acid cation exchange resins.

Usually, formula (XIII) is derived from SBI, due to its ease in preparation and the commercial availability and low cost of BPA. Where formula (XIII) is an SBI moiety, $R^1$ is hydrogen, and $R^2$ is methyl.

In another embodiment, $A^2$ or $A^3$ is a moiety having formula (XIV), wherein x is 0 or 1. When x is 0, formula (XIV) is a derivative of a substituted or unsubstituted biphenol, and when x is 1, (XIV) is a derivative of a bisphenol wherein a bridging carbon connects the phenol moieties. Due to their commercial availability, structure (XIV) is preferably a derivative of one of the following: 4,4'-biphenol, wherein x is 0, and each $R^1$ is hydrogen; BPA, wherein x is 1, each $R^1$ is hydrogen, and each $R^2$ is a methyl group; or 4,4'-(hexafluoroisopropylidene)diphenol, commonly known as hexafluorobisphenol A, wherein x is 1, each $R^1$ is hydrogen, and each $R^2$ is trifluoromethyl.

In still other embodiments, $A^2$ or $A^3$ is a moiety having formula (XV) derived from hydroquinone, a moiety having formula (XVI), which is derived from resorcinol, or a moiety having formula (XVII), which is derived from ethylene glycol bis(anhydrotrimellitate). Alternatively, in the indane polyetherimides, $A^2$ or $A^3$ in structural units (II) or (III) may be a single bond, or a bridging radical which separates $Z^2$ from $Z^1$. Examples of bridging radicals include —O—, —S—, —$SO_2$—, —CO—, —C(CH$_3$)$_2$—, —C(CD$_3$)$_2$—, or —C(CF$_3$)$_2$—.

The relative amounts of structural units (I), (II), and (III) in the polymeric indane polyetherimide compositions can be represented as mole fractions, where the mole fraction of (II) is given by m, the mole fraction of (III) is given by n, and the mole fraction of structural unit (I) is 1−(m+n). The values of m and n are each independently from 0 to about 0.99, and the sum of m and n is from 0 to about 0.99. Thus, linear indane polyetherimide homopolymers containing only structural units (I), wherein m and n are 0, are included in the present invention, as well as linear copolyetherimides containing the additional structure (II), wherein m is greater than 0, and optionally (III), wherein n is also greater than 0. In the indane copolyetherimide compositions, the structural units (I) and (II), and (III) when (III) is included, are randomly dispersed along the polymeric chain backbone to form a "random copolymer".

The molar proportions of structural units (I) to structural units (II) and optionally (III) will depend on whether the indane polyetherimide polymer being prepared is a homopolyether or a copolyether. When the polyetherimide is a random copolymer, the mole fractions of the structural units may vary widely depending on the application and which properties are desired. For example, the relative molar proportions of a typical copolymer containing structures (I) and (II) could be 50:50, wherein m is 0.50, n is 0, and 1−(m+n) is 0.50, and a copolymer containing (I), (II), and (III) could be 33:33:33, wherein m and n are each 0.33, and 1−(m+n) is 0.33.

The weight average molecular weight (Mw, kg/mole) of the indane polyetherimide polymers of the present invention generally ranges from about 10 kg/mole to about 500 kg/mole. A high molecular weight ($\geq$10 kg/mole) is desirable to ensure that the integrity of the material is maintained when exposed to high temperatures (>200° C.). The high molecular weight indane polyetherimide polymers of the present invention exhibit excellent thermal properties, such as high glass transition temperatures (Tg) of at least 200° C., but typically greater than 220° C. Thus, the present indane polyetherimides remain thermally stable at high temperatures making them particularly useful in high temperature processing and optoelectronics applications.

Consideration will now be given to the preparation of the indane polyetherimide polymers with preferred parameters and illustrative methods. Unless otherwise indicated, the remaining reactants and reagents used in the reactions described below are readily available materials. Such materials can be conveniently prepared in accordance with conventional preparatory procedures or obtained from commercial sources. Deuterated compounds for use in the preparation of deuterated indane polyetherimides may be prepared using deuterated reactants in the reactions below.

The indane polyetherimides of the present invention may be prepared by the processes described below and in the following examples in which intermediates having the general formula (XVIII) are formed:

Y—X—Y     (XVIII)

"X" is an indane bisphenol derivative of structure $A^1$ or is one of $A^2$ or $A^3$, i.e. a bisphenol or biphenol derivative of formula (XIII)–(XVII), a single bond, —O—, —S—, —$SO_2$—, —CO—, —C(CH$_3$)$_2$—, —C(CD$_3$)$_2$—, or —C(CF$_3$)$_2$—. As used herein, a "bisimide" or "bis-N-alkylimide" refers to a compound wherein each "Y" in formula (XVIII) above is represented by formula (XVIIIa):

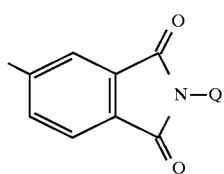

(XVIIIa)

wherein Q is an alkyl group containing 1 to 10 carbons; a "tetracarboxylic acid" or "tetraacid" of "X" is formed when each "Y" is structure (XVIIIb):

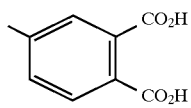

(XVIIIb)

an "X"-"dianhydride" or "diphthalic anhydride" refers to a compound wherein each "Y" is represented by structure (XVIIIc):

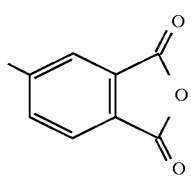

(XVIIIc)

"nitrophenoxy" refers to the "Y" functional group having the structure (XVIIId):

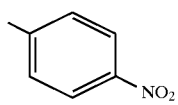

(XVIIId)

and a "diphenoxyamine" or "diamine" of "X" is formed when formula (XVIII) contains two aminophenoxy groups, and each "Y" is structure (XVIIIe):

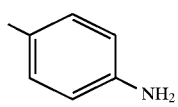

(XVIIIe)

In general, the dianhydrides of structure (XVIIIc), which are described herein, (and by extension, other derivatives of tetracarboxylic acids (XVIIIb) by way of their conversion to dianhydrides) may be converted to the polyetherimides of this invention by reaction with diamines. Such conversions are well-known in the art, and the following processes and accompanying examples are descriptive of the conversions as they relate to the preparation of the present indane polyetherimide polymers.

Process temperatures in the polymerization reactions are not critical and can vary widely. The polymerization reactions may be conducted at room temperature, between about 20°–25° C., or alternatively, at elevated temperatures up to about 225° C.

The processes are carried out in an inert atmosphere over a period of time sufficient to produce the desired polymer in adequate yield. Reaction times are influenced by the reactants, reactant temperature, the concentration of the reactants (and catalyst if present), the choice of solvent, and other factors known to those of skill in the art. In general, reaction times can vary between about 4.5 hours for preparing polyetherimides at elevated temperatures and 68 hours at room temperature.

Procedure

The indane polyetherimide polymers of the present invention can be prepared by initially reacting an indane bisphenol, such as IBP, with an N-alkyl-4-nitrophthalimide, wherein the alkyl group may have from 1 to 10 carbons. N-methyl-4-nitrophthalimide, which is commercially available from GE, is preferred. An indane bisimide of formula (XVIIIa) above, wherein X is $A^1$, containing the electron-deficient N-alkyl substitutent is produced. Hydrolysis of the bisimide to the corresponding tetracarboxylic acid of formula (XVIIIb) followed by dehydration produces the indane diphthalic anhydride (dianhydride) of structure (XVIIIc). Finally, polymerization is conducted by reacting an appropriate diamine with the dianhydride to produce an indane polyetherimide polymer.

Diamines useful in the polymerization (from which structures (IV)–(XII) of $R^3$ are derived) may be substituted or unsubstituted. Examples include m- or p-phenylenediamine from which structures (IV) and (V) are derived. Other examples include 4,4'-oxydianiline (diamine of (VI), $R^1$=H); 1,4-bis(4-aminophenoxy)benzene (diamine of (VII), $R^1$=H); 1,3-bis(4-aminophenoxy)benzene (diamine of (VIII), $R^1$=H); 4,4'-(diamino)biphenyl, commonly known as benzidine (diamine of (IX), y=0, $R^1$=H); 2,2'-bis(4-aminophenyl)propane (diamine of (IX), y=1, $R^1$=H, $R^2$=$CH_3$); 2,2'-bis(4-aminophenyl)hexafluoropropane (diamine of (IX), y=1, $R^1$=H, $R^2$=$CF_3$); 2,2'-bis[4-(4-aminophenoxy)phenyl]propane (diamine of (X), $R^1$=H, $R^2$=$CH_3$); 2,2'-bis[4-(4-aminophenoxy)phenyl]hexafluoropropane (diamine of (X), $R^1$32 H, $R^2$=$CF_3$); 4,4'-diaminophenyl sulfone (diamine of (XI), $R^1$=H; and 4,4'-diaminobenzophenone (diamine of (XII), $R^1$=H.

Approximately equimolar amounts of the indane dianhydride and diamine are typically reacted in a high boiling polar aprotic solvent, such as N-methyl-2-pyrrolidinone (NMP), dimethylformamide (DMF), or dimethyl sulfoxide (DMSO) producing an indane polyetherimide homopolymer comprising structural units (I).

To produce a random copolymer in which structural units (I) and (II) are randomly distributed, a dianhydride, as defined above, of formulas (XIII)–(XVII), such as SBI dianhydride, BPA dianhydride, 4,4'-biphenol dianhydride, hexafluorobisphenol A dianhydride, hydroquinone dianhydride, resorcinol dianhydride, or ethylene glycol bis (anhydrotrimellitate), for example, may be added to the polymerization reaction in varying molar amounts, and the amount of diamine appropriately adjusted. For example, the dianhydride of an indane moiety ($A^1$) can be added in equimolar amounts with 4,4'-biphenol dianhydride (dianhydride of formula XIV, wherein x is 0 and $R^1$ is hydrogen) and reacted with a diamine present in a molar amount equal to the total moles of the two dianhydride compounds. A random copolymer comprising 50% of each structural unit (I) and (II) is produced. Other dianhydrides that may be added include those in which a single bond, —O—, —S—, —$SO_2$—, —CO—, —$C(CH_3)_2$—, —$C(CD_3)_2$—, or —$C(CF_3)_2$— bridges each phthalic anhydride unit. These additional dianhydrides are commercially available from Chrisev Co., Inc., USA or from TCI America, USA.

In addition, a third dianhydride, differing from but chosen from those described above with respect to the first two, may be reacted with an equivalent molar amount of diamine added to produce a random copolyetherimide polymer in which structures (I), (II), and (III) are randomly distributed throughout the polymeric chain. As stated above, the mole fractions of structures (I), (II), and optionally (III) may vary widely depending on the properties desired in the resulting polyetherimide polymer.

Particularly preferred indane polyetherimides of the present invention are those wherein $R^3$ is formula (IV), and more preferably wherein each $R^2$ is methyl, and each $R^1$ is hydrogen in structural units (I) These indane polyetherimides have structural units (I) represented by

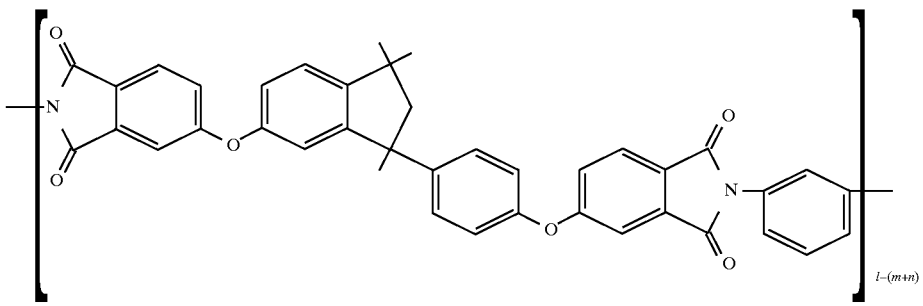

The following examples are illustrative, but the present invention is not limited to the specific embodiments found therein.

EXAMPLE 1
(i) Synthesis of IBP Bisimide

A 1 L three-neck round bottomed flask equipped with a nitrogen inlet, thermometer, Dean-Stark trap, and condenser was charged with 5-hydroxy-3-(4-hydroxyphenyl)-1,1,3-trimethylindane (20 g, 74.5 mmol), dimethyl sulfoxide (DMSO) (130 mL), toluene (140 mL), and aqueous sodium hydroxide (50% w/w, 11.6 g). The solution was magnetically stirred and heated to reflux for 3 h, then cooled to ~60° C., followed by the addition of N-methyl-4-nitrophthalimide (29.8 g, 144.5 mmol) and tetrabutylammonium bromide (1.16 g, 3.6 mmol). The resulting solution was refluxed for 5 additional hours. Toluene was removed at reduced pressure, and the resulting reaction mixture was precipitated into water (200 mL). The crude product was collected by suction filtration, then recrystallized from methanol (200 mL) to give the desired IBP bisimide (32 g, 77% yield). The structure was confirmed by proton nuclear magnetic resonance.

(ii) Synthesis of IBP Tetraacid

A 250 mL round bottomed flask equipped with a condenser was charged with the bisimide product of step (i) (15 g, 25.5 mmol), potassium hydroxide (16.3 g, 290 mmole), and water (60 mL). The solution was magnetically stirred and refluxed for 3 days. The solution was then cooled to room temperature and poured into aqueous hydrochloric acid (70 mL conc. HCl in 140 mL of water). The solution was extracted with ethyl acetate (3×30 mL), the ethyl acetate layer isolated and evaporated to dryness to give the desired IBP tetraacid (12 g, 78% yield). The structure was confirmed by proton nuclear magnetic resonance.

(iii) Synthesis of IBP Dianhydride

IBP tetraacid (12 g) in acetic anhydride (24 mL) was heated to reflux for 1 min. in a 250 mL round bottomed flask, then the solvent was removed under reduced pressure. The resulting crude IBP dianhydride was purified by short path distillation at 330° C. at 0.2 mm Hg pressure to yield pure IBP dianhydride (6.5 g). Proton nuclear magnetic resonance was used to confirm the structure.

(iv) Synthesis of IBP Polyetherimide

The polymerization was conducted in a 25 mL round bottomed flask in an argon-filled glove box. The flask was charged with IBP dianhydride (1.500 g, 2.7 mmole), m-phenylenediamine (0.289 g, 2.7 mmole), and N-methyl-2-pyrrolidinone (NMP) (10 g). The solution was stirred at room temperature for 12 h, followed by the addition of acetic anhydride (1 mL) and triethylamine (1.5 mL). The resulting solution was stirred at room temperature for another 48 h, and precipitated into methanol. The precipitate was filtered, then dried in a vacuum oven (120° C.) for 12 h to give the desired IBP polyetherimide (1.56 g, 90% yield).

The homopolyetherimide comprises structural units (I) represented by $-[Z^1-A^1-Z^2]-$, wherein $R^3$ is (IV), each $R^1$ is hydrogen, and each $R^2$ is methyl. The structure was confirmed by proton nuclear magnetic resonance.

Characterization:

Glass transition temperature (Tg)=232° C.;

Weight average molecular weight (Mw)=23 kg/mole

Thermal analysis for the calculation of glass transition temperature (Tg) was performed in a nitrogen atmosphere (40 mL/min.) at a heating rate of 20° C./min. using a Perkin Elmer Differential Scanning Calorimeter (DSC) 7 equipped with Pyris software. Weight average molecular weight, Mw, was measured by gel permeation chromatography (GPC) and calibrated against a polystyrene standard.

EXAMPLE 2

The procedure of Example 1 is repeated except that in step (iv), the flask is charged with IBP dianhydride (1.500 g, 2.7 mmole), bisphenol A (BPA) dianhydride (1.405 g, 2.7 mmole), m-phenylenediamine (0.584 g, 5.4 mmole), and NMP (19 g). The solution is stirred at room temperature for 12 h, then acetic anhydride (2 mL) and triethylamine (3 mL) are added. The resulting solution is stirred at room temperature for another 48 h, and precipitated into methanol. The precipitate is filtered, and dried in a vacuum oven (120° C.) for 12 h to give the desired random IBP copolymer containing structural units (I) and (II), each having a mole fraction of 0.50. Structural unit (I) contains the indane moiety and is represented as $-[Z^1-A^1-Z^2]-_{0.50}$, wherein $R^3$ in $Z^2$ is (IV), each $R^1$ is hydrogen, and each $R^2$ is methyl. Structural unit (II) comprises $-[Z^1-(XIV)-Z^2]-_{0.50}$, wherein $R^3$ is (IV), each $R^1$ is hydrogen, x is 1, and each $R^2$ is methyl. The structure is confirmed by proton nuclear magnetic resonance.

EXAMPLES 3–8

The procedure of Example 2 is repeated except that the molar proportions of IBP dianhydride, BPA dianhydride, and m-phenylenediamine are varied to produce random IBP copolyetherimides containing structural units (I) and (II) having the following exemplary molar proportions ((I):(II)): 5:95; 25:75; 60:40; 75:25; 80:20; and 95:5. The structures are confirmed by proton nuclear magnetic resonance.

EXAMPLE 9

The procedure of Example 2 is repeated substituting an equimolar amount of SBI dianhydride for the BPA dianhydride. The SBI dianhydride is prepared following steps (i), (ii), and (iii) of Example 1 except that SBI is used in place of 5-hydroxy-3-(4-hydroxyphenyl)-1,1,3-trimethylindane.

The polymerization reaction produces an IBP-SBI polyetherimide containing the following randomly-distributed structural units (I) and (II), each unit having a mole fraction of 0.50: (I): —[Z¹—A¹—Z²—]₀.₅₀, wherein R³ in Z² is (IV), each R¹ is hydrogen, and each R² is methyl; (II): —[Z¹—(XIII)—Z²]₀.₅₀, wherein R³ is (IV), each R¹ is hydrogen, and each R² is methyl. The structure is confirmed by proton nuclear magnetic resonance.

EXAMPLES 10–15

The procedure of Example 9 is repeated except that the proportions of IBP dianhydride, SBI dianhydride, and m-phenylenediamine are varied to produce random IBP copolyetherimides containing structural units (I) and (II) having the following exemplary mole percentages ((I):(II)): 5:95; 25:75; 60:40; 75:25; 80:20; and 95:5. The structures are confirmed by proton nuclear magnetic resonance.

EXAMPLES 16–23

The procedure of Example 2 is followed substituting for the BPA dianhydride an equimolar amount of one of the following: 4,4'-biphenol dianhydride, hexafluorobisphenol A dianhydride, resorcinol dianhydride, hydroquinone dianhydride or ethylene glycol bis(anhydrotrimellitate) or a dianhydride wherein a single bond, —O—, —S—, —SO₂—, —CO—, —C(CH₃)₂—, —C(CD₃)₂—, —C(CF₃)₂—, bridges each phthalic anhydride unit. Structure (I) is that of Example 2, and structure (II) comprises [Z¹—A²—Z²]₀.₅₀, wherein A² is one of formulas (XIV): x=0 or 1; (XV), (XVI), (XVII), or a single bond, or —O—, —S—, —SO₂—, —CO—, —C(CH₃)₂—, —C(CD₃)₂—, or —C(CF₃)₂—, respectively. R³ is (IV), each R¹ is hydrogen, and each R² is methyl, except in formula (XIV) where each R² is CF₃ on the bridging carbon when x is 1. The structures are confirmed by proton nuclear magnetic resonance.

EXAMPLE 24

The procedure of Example 1 is repeated except that in step (iv), the flask is charged with IBP dianhydride (1.00 g, 1.8 mmole), bisphenol A (BPA) dianhydride (0.937 g, 1.8 mmole), SBI dianhydride (1.08 g, 1.8 mmole), m-phenylenediamine (0.584 g, 5.4 mmole), and NMP (19 g). The solution is stirred at room temperature for 12 h, then acetic anhydride (2 mL) and triethylamine (3 mL) are added. The resulting solution is stirred at room temperature for another 48 h, and precipitated into methanol. The precipitate is filtered, and dried in a vacuum oven (120° C.) for 12 h to give the desired random IBP copolymer containing structural units (I), (II), and (III), each having a mole fraction of 0.33. Structural unit (I) contains the indane moiety and is represented as —[Z¹—A¹—Z²]₀.₃₃; structural unit (II) comprises —[Z¹—(XIV)—Z²]₀.₃₃, wherein x is 1; structural unit (III) is —[Z¹—(XIII)—Z²]₀.₃₃. In each of (I), (II), and (III), R³ in Z² is (IV), each R¹ is hydrogen, and each R² is methyl. The structure is confirmed by proton nuclear magnetic resonance.

EXAMPLE 25

The procedure of Example 24 is repeated except that the following amounts of the dianhydrides are reacted with m-phenylenediamine (0.584 g, 5.4 mmole) in NMP (19 g): IBP dianhydride (1.500 g, 2.7 mmole), bisphenol A (BPA) dianhydride (0.73 g, 1.35 mmole), SBI dianhydride (0.81 g, 1.35 mmole). A random indane copolymer is formed containing structural units (I), (II), and (III) in the following molar proportion: 50:25:25. Structural unit (I) is represented by formulas —[Z¹—A¹—Z²]₀.₅₀, wherein R³ is (IV), each R¹ is hydrogen, and each R² is methyl. Structural unit (II) comprises —[Z¹—(XIV)—Z²]₀.₂₅, wherein R³ is (IV), each R¹ is hydrogen, x is 1, and each R² is methyl. Structural unit (III) is —[Z¹—(XIII)—Z²]₀.₂₅, wherein R³ is (IV), each R¹ is hydrogen, x is 1, and each R² is methyl. The structure is confirmed by proton nuclear magnetic resonance.

The indane polyetherimide polymers of the present invention exhibit excellent thermal and optical properties and are of high molecular weight making them useful in high temperature processing, optical, and optoelectronics applications.

While the invention has been particularly shown and described with reference to the preferred embodiments thereof, it will be understood by those skilled in the art that other changes in form and details may be made therein without departing from the spirit and scope of the invention.

I claim:

1. A linear indane polyetherimide polymer comprising structural units of formulas (I), (II), and (III)

and

wherein m is the mole fraction of structure (II), n is the mole fraction of structure (III), and the quantity 1−(m+n) is the mole fraction of structure (I); wherein m and n each independently have a value from 0 to about 0.99, and the sum of m and n is from 0 to about 0.99;

A¹ is an indane moiety represented by structural formula

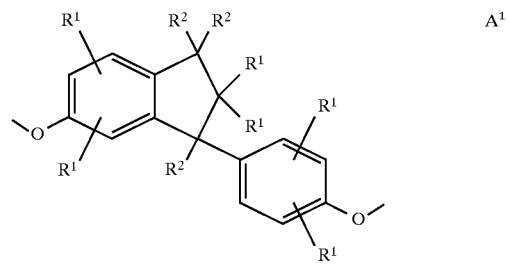

Z¹ and Z² are structural moieties represented by

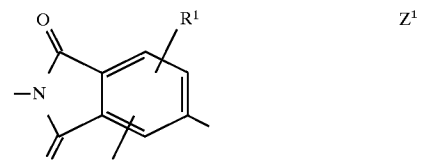

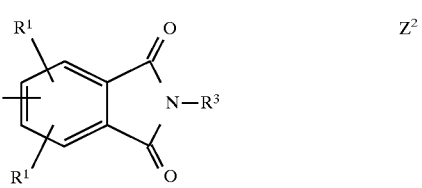

wherein R³ is selected from the group of structural moieties having formulas (IV), (V), (VI), (VII), (VIII), (IX), (X), (XI), or (XII)

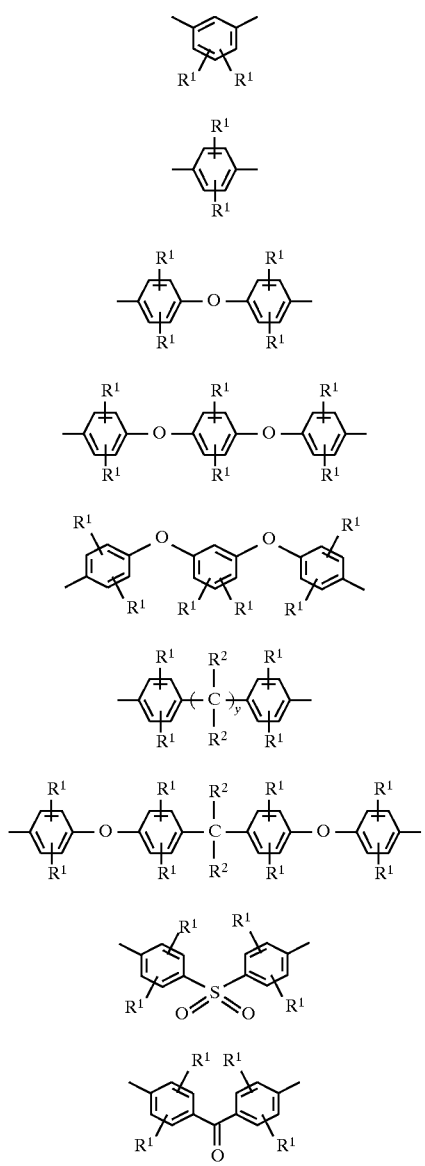

wherein y is 0 or 1;

$A^2$ and $A^3$ are each independently a single bond, —O—, —S—, —SO$_2$—, —CO—, —C(CH$_3$)$_2$—, —C(CD$_3$)$_2$—, or —C(CF$_3$)$_2$—, or a structural moiety selected from the group having formulas (XIII), (XIV), (XV), (XVI), or (XVII)

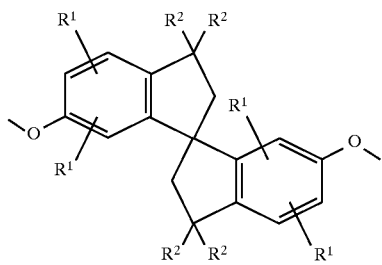

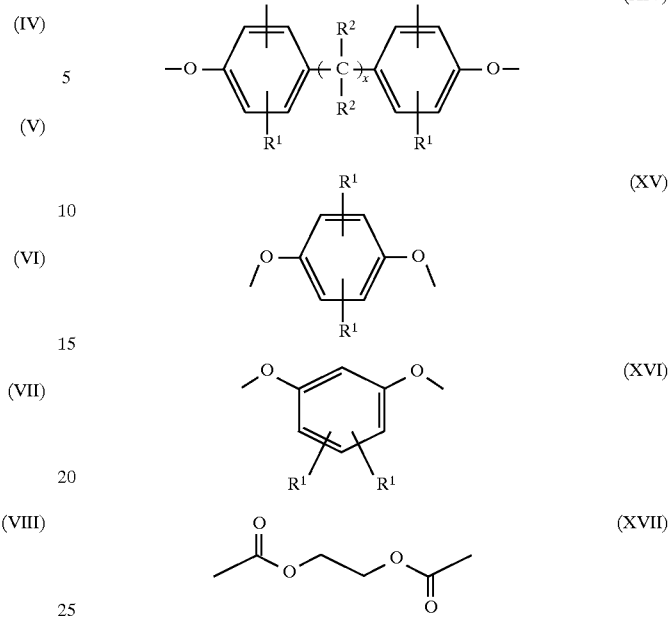

wherein x is 0 or 1;

and wherein each $R^1$ and $R^2$ is independently hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, nitro, halogen, cyano, hydroxy, or deuterated equivalents thereof.

2. The polymer of claim 1, wherein m and n are each 0.

3. The polymer of claim 1, wherein n is 0, and m has a value other than 0, and said structural units (I) and (II) are randomly distributed in said polymer.

4. The polymer of claim 3, wherein m is about 0.50.

5. The polymer of claim 1, wherein m and n each have values other than 0, and said structural units (I), (II), and (III) are randomly distributed in said polymer.

6. The polymer of claim 5, wherein m and n are each about 0.33.

7. The polymer of claim 1, wherein $R^3$ is said structural moiety having formula (IV).

8. The polymer of claim 7, wherein each $R^1$ is hydrogen, and each $R^2$ is methyl.

9. The polymer of claim 1, wherein the weight average molecular weight of said polymer is between about 10 kg/mole and 500 kg/mole.

10. The polymer of claim 1 having a glass transition temperature of at least 200° C.

11. The polymer of claim 1, wherein each $R^1$ is hydrogen or deuterium, and each $R^2$ is methyl, trifluoromethyl, or a deuterated equivalent thereof.

12. A linear indane polyetherimide polymer comprising structural moieties derived from 5-hydroxy-3-(4-hydroxyphenyl)-1,1,3-trimethyl indane, said polymer having a glass transition temperature of at least 200° C.

13. The polymer of claim 12 further comprising structural moieties derived from m-phenylenediamine.

* * * * *